(12) United States Patent
Gandhi et al.

(10) Patent No.: US 11,479,308 B2
(45) Date of Patent: Oct. 25, 2022

(54) ACTIVE VEHICLE INTERFACE FOR CROSSWIND MANAGEMENT

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 519 days.

(21) Appl. No.: 16/243,562

(22) Filed: Jan. 9, 2019

(65) Prior Publication Data
US 2020/0216121 A1 Jul. 9, 2020

(51) Int. Cl.
*B62D 37/02* (2006.01)
*F15B 15/10* (2006.01)
*F15B 21/06* (2006.01)

(52) U.S. Cl.
CPC .............. *B62D 37/02* (2013.01); *F15B 15/10* (2013.01); *F15B 21/065* (2013.01)

(58) Field of Classification Search
CPC ......... B62D 37/02; F15B 15/10; F15B 21/065
(Continued)

(56) References Cited

U.S. PATENT DOCUMENTS

| 2,241,086 A | 1/1939 | Gould |
| 4,286,910 A | 9/1981 | Conrad |

(Continued)

FOREIGN PATENT DOCUMENTS

| JP | H07303381 A | 11/1995 |
| JP | 2007097292 A | 4/2007 |

(Continued)

OTHER PUBLICATIONS

Collins, Danielle, "FAQ: What are stacked piezo actuators and what do they do?" Nov. 5, 2015, <https://www.motioncontroltips.com/faq-what-are-stacked-piezo-actuators-and-what-do-they-do/> (Year: 2015).*

(Continued)

*Primary Examiner* — Krishnan Ramesh
(74) *Attorney, Agent, or Firm* — Christopher G. Darrow; Darrow Mustafa PC

(57) ABSTRACT

A dynamic interface between a vehicle windshield and a structure (e.g., an A-pillar) is provided. The dynamic interface can be actively managed to allow its configuration to be selectively changed based on real-time driving environment conditions. The interface can include one or more actuators that can be selectively activated or deactivated to change the aerodynamic characteristics of the interface. When a crosswind activation condition is detected, the actuator(s) can be activated. The actuator(s) can be soft-bodied structures. The actuator(s) can include a bladder defining a fluid chamber filled with a dielectric fluid. A first conductor and a second conductor can be operatively positioned on opposite portions of the bladder. When electrical energy is supplied to the conductors, they can become oppositely charged. As a result, the conductors can be electrostatically attracted toward each other, displacing some of the dielectric fluid to an outer peripheral region of the fluid chamber.

13 Claims, 8 Drawing Sheets

(58) Field of Classification Search
USPC .......................................................... 701/49
See application file for complete search history.

(56) References Cited

U.S. PATENT DOCUMENTS

| | | | |
|---|---|---|---|
| 4,319,427 A | | 3/1982 | Way, Jr. |
| 4,726,656 A | | 2/1988 | Schofield et al. |
| 4,848,179 A | | 7/1989 | Ubhayakar |
| 4,958,100 A | | 9/1990 | Crawley et al. |
| 4,964,062 A | | 10/1990 | Ubhayakar et al. |
| 5,021,798 A | | 6/1991 | Ubhayakar |
| 5,065,978 A | | 11/1991 | Albarda et al. |
| 5,222,668 A | | 6/1993 | Frankeny et al. |
| 5,502,345 A | | 3/1996 | Kahn et al. |
| 5,536,062 A | * | 7/1996 | Spears ................ B62D 35/001 296/180.5 |
| 5,668,432 A | | 9/1997 | Tominaga et al. |
| 6,065,978 A | | 5/2000 | Dehan et al. |
| 6,120,002 A | | 9/2000 | Biegelsen et al. |
| 6,215,221 B1 | | 4/2001 | Cabuz et al. |
| 6,415,883 B1 | | 7/2002 | Myrholt et al. |
| 6,490,960 B1 | | 12/2002 | Jackson et al. |
| 6,685,442 B2 | | 2/2004 | Chinn et al. |
| 6,702,301 B1 | | 3/2004 | Davies et al. |
| 6,830,071 B2 | | 12/2004 | Xu et al. |
| 6,939,291 B2 | | 9/2005 | Phee Soo Jay |
| 7,252,313 B2 | | 8/2007 | Browne et al. |
| 7,353,747 B2 | | 4/2008 | Swayze et al. |
| 7,484,735 B2 | | 2/2009 | Verbrugge et al. |
| 7,575,807 B1 | | 8/2009 | Barvosa-Carter et al. |
| 7,594,697 B2 | | 9/2009 | Browne et al. |
| 7,673,562 B2 | | 3/2010 | Pattekar et al. |
| 7,755,840 B2 | | 7/2010 | Batchko et al. |
| 7,892,630 B1 | | 2/2011 | McKnight et al. |
| 7,901,524 B1 | | 3/2011 | McKnight et al. |
| 7,905,538 B2 | | 3/2011 | Ukpai et al. |
| 7,909,403 B2 | | 3/2011 | Lawall et al. |
| 8,136,875 B2 | | 3/2012 | Laake |
| 8,222,799 B2 | | 7/2012 | Polyakov et al. |
| 8,231,563 B2 | | 7/2012 | Mauge et al. |
| 8,240,677 B2 | | 8/2012 | Browne et al. |
| 8,272,392 B2 | | 9/2012 | Pattekar et al. |
| 8,430,810 B2 | | 4/2013 | Hassidov et al. |
| 8,863,608 B2 | | 10/2014 | Fischer et al. |
| 9,061,118 B2 | | 6/2015 | Shoham et al. |
| 9,308,949 B1 | * | 4/2016 | Mihelic ................ B62D 35/001 |
| 9,580,115 B2 | | 2/2017 | Haller |
| 9,764,113 B2 | | 9/2017 | Tuval et al. |
| 9,790,968 B2 | | 10/2017 | Yang et al. |
| 9,919,418 B2 | | 3/2018 | Hashimoto |
| 9,937,966 B1 | * | 4/2018 | Yoon ...................... F03G 7/065 |
| 9,970,564 B2 | | 5/2018 | Dankbaar et al. |
| 10,058,647 B2 | | 8/2018 | Roche et al. |
| 10,224,279 B2 | | 3/2019 | Or-Bach et al. |
| 10,293,718 B1 | | 5/2019 | Ilievski et al. |
| 10,302,586 B2 | | 5/2019 | Sun et al. |
| 10,465,723 B2 | | 11/2019 | Ilievski et al. |
| 10,631,083 B1 | | 4/2020 | Gandhi et al. |
| 10,640,033 B1 | | 5/2020 | Gandhi et al. |
| 10,682,903 B1 | | 6/2020 | Gandhi et al. |
| 10,682,931 B2 | | 6/2020 | Rowe et al. |
| 10,746,206 B1 | | 8/2020 | Rowe et al. |
| 10,749,448 B2 | | 8/2020 | Lindsay et al. |
| 10,797,217 B2 | | 10/2020 | Hakkens et al. |
| 10,946,535 B2 | | 3/2021 | Gandhi et al. |
| 2002/0100888 A1 | | 8/2002 | Sharma et al. |
| 2004/0107829 A1 | | 6/2004 | Davis et al. |
| 2004/0261411 A1 | | 12/2004 | MacGregor |
| 2005/0045480 A1 | | 3/2005 | Krumme |
| 2005/0198904 A1 | | 9/2005 | Browne et al. |
| 2005/0200248 A1 | | 9/2005 | Chen et al. |
| 2005/0202248 A1 | | 9/2005 | Browne et al. |
| 2005/0206096 A1 | | 9/2005 | Browne et al. |
| 2006/0032715 A1 | | 2/2006 | Barvosa-Carter et al. |
| 2006/0038745 A1 | | 2/2006 | Naksen et al. |
| 2007/0046074 A1 | | 3/2007 | Satta et al. |
| 2007/0120438 A1 | | 5/2007 | Divoux |
| 2007/0246898 A1 | | 10/2007 | Keefe et al. |
| 2009/0052049 A1 | | 2/2009 | Batchko et al. |
| 2009/0086331 A1 | | 4/2009 | Gunasekaran et al. |
| 2009/0115285 A1 | | 5/2009 | Najafi et al. |
| 2009/0243319 A1 | * | 10/2009 | Browne ................ B60N 3/023 296/1.02 |
| 2009/0255187 A1 | | 10/2009 | Alexander et al. |
| 2010/0090497 A1 | * | 4/2010 | Beckon .................... B60Q 1/44 296/180.1 |
| 2010/0258362 A1 | | 10/2010 | Trimmer |
| 2011/0188258 A1 | | 8/2011 | Tajima |
| 2011/0241377 A1 | * | 10/2011 | Rogers ................ B62D 35/001 296/180.3 |
| 2012/0287493 A1 | | 11/2012 | Kuhlman et al. |
| 2012/0292945 A1 | * | 11/2012 | Nusbaum ............ B62D 35/001 296/180.4 |
| 2013/0255815 A1 | | 10/2013 | Brinkmann et al. |
| 2013/0304049 A1 | | 11/2013 | Behnke, II et al. |
| 2013/0318962 A1 | | 12/2013 | Joshi et al. |
| 2014/0109560 A1 | | 4/2014 | Ilievski et al. |
| 2014/0139450 A1 | | 5/2014 | Levesque et al. |
| 2015/0185849 A1 | | 7/2015 | Levesque et al. |
| 2015/0197173 A1 | | 7/2015 | Hulway |
| 2015/0331156 A1 | | 11/2015 | Hirsa |
| 2016/0106620 A1 | | 4/2016 | Uno et al. |
| 2017/0036709 A1 | * | 2/2017 | Metka .................. B62D 35/001 |
| 2017/0080987 A1 | * | 3/2017 | Morgan ............... B62D 35/005 |
| 2017/0150252 A1 | | 5/2017 | Trestain et al. |
| 2017/0225623 A1 | * | 8/2017 | Gaylard ............... B62D 35/007 |
| 2017/0240221 A1 | * | 8/2017 | Gaylard ............... B62D 35/008 |
| 2017/0240223 A1 | * | 8/2017 | Gaylard ................ B62D 35/02 |
| 2017/0240224 A1 | * | 8/2017 | Gaylard ............... B62D 35/008 |
| 2017/0297634 A1 | | 10/2017 | Han et al. |
| 2018/0036198 A1 | | 2/2018 | Mergl et al. |
| 2018/0172172 A1 | | 6/2018 | Oehler et al. |
| 2018/0339624 A1 | | 11/2018 | Leck |
| 2019/0023161 A1 | | 1/2019 | Sullivan et al. |
| 2019/0032684 A1 | | 1/2019 | Kowalewski et al. |
| 2019/0044246 A1 | | 2/2019 | Pitsillides et al. |
| 2019/0059608 A1 | | 2/2019 | Yan et al. |
| 2019/0232822 A1 | | 8/2019 | Hintermaier |
| 2019/0296217 A1 | | 9/2019 | Jung et al. |
| 2019/0312193 A1 | | 10/2019 | Pelssers et al. |
| 2019/0322324 A1 | * | 10/2019 | Hurst ................... B62D 35/007 |
| 2019/0326505 A1 | | 10/2019 | Pelssers et al. |
| 2019/0342985 A1 | * | 11/2019 | Dadheech .............. B62D 35/00 |
| 2020/0032822 A1 | * | 1/2020 | Keplinger ............... F15B 15/08 |
| 2020/0066963 A1 | | 2/2020 | Johnson et al. |
| 2020/0130202 A1 | | 4/2020 | Gandhi et al. |
| 2020/0130321 A1 | | 4/2020 | Gandhi et al. |
| 2020/0132213 A1 | | 4/2020 | Gandhi et al. |
| 2020/0132223 A1 | | 4/2020 | Prokhorov et al. |
| 2020/0136525 A1 | | 4/2020 | Gandhi et al. |
| 2020/0136526 A1 | | 4/2020 | Gandhi et al. |
| 2020/0156237 A1 | | 5/2020 | Tang et al. |
| 2020/0156314 A1 | | 5/2020 | Rowe et al. |
| 2020/0180708 A1 | * | 6/2020 | Khalighi ................. B62D 35/00 |
| 2020/0182269 A1 | | 6/2020 | Rowe |
| 2020/0189469 A1 | | 6/2020 | Gandhi et al. |
| 2020/0238854 A1 | | 7/2020 | Gandhi et al. |
| 2020/0259426 A1 | | 8/2020 | Rowe |

FOREIGN PATENT DOCUMENTS

| | | |
|---|---|---|
| KR | 20050056526 A | 6/2005 |
| WO | 2017077541 A1 | 5/2017 |
| WO | 2018175741 A1 | 9/2018 |

OTHER PUBLICATIONS

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

(56) References Cited

OTHER PUBLICATIONS

Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).
SMC Tech, "Precision Regulator: Series IR1000/2000/3000", SMC Tech, pp. 713-725 and 1-19, 2015 (53 pages).
Acome et al., "Hydraulically Amplified Self-Healing Electrostatic Actuators with Muscle-Like Performance," Science, vol. 359, Issue 6371, pp. 61-65 (Jan. 5, 2018) (6 pages).

* cited by examiner

ACTIVE VEHICLE INTERFACE FOR CROSSWIND MANAGEMENT

FIELD

The subject matter described herein relates in general to vehicles and, more particularly, to the management of crosswinds encountered by a vehicle.

BACKGROUND

Vehicles are exposed to various environmental conditions during their operation. In some situations, a vehicle may be exposed to side wind gusts, which can result in the development of vortices at various vehicle interfaces. Such vortices can adversely affect the aerodynamic performance of the vehicle. One example of such a vehicle interface is between vehicle window glass and the A-pillar of the vehicle. The vehicle window glass and the A-pillar can be offset from each other to form a step at the interface. The vehicle window glass and the A-pillar can be fixed relative to each other such that the interface is static.

SUMMARY

In one respect, the subject matter presented herein is directed to a system for actively managing crosswinds for a vehicle. The system can include a windshield and a vehicle structure. A portion of the vehicle structure can be selectively movable. An interface can be defined between the windshield and the vehicle structure. The system can include at least one actuator operatively positioned to cause the portion of the vehicle structure to move. As a result, the aerodynamic characteristics of the interface can be altered. The actuator can include a bladder. The bladder can include a flexible casing and can define a fluid chamber. The fluid chamber can include a dielectric fluid. The actuator can include a first conductor and a second conductor operatively positioned on opposite portions of the bladder. The actuator can be configured such that, when electrical energy is supplied to the first conductor and the second conductor, the first conductor and the second conductor have opposite charges. As a result, the first conductor and the second conductor can be electrostatically attracted toward each other to cause at least a portion of the dielectric fluid to be displaced to an outer peripheral region of the fluid chamber. The outer peripheral region of the flexible casing can bulge such that an overall height of the actuator increases.

In another respect, the subject matter presented herein is directed to a method of actively managing crosswinds at a vehicle interface. The interface can be defined between a windshield and a vehicle structure. The vehicle structure can include a base structure and a molding. The molding can be selectively movable by one or more actuators. The method can include detecting a crosswind activation condition. The method can include, responsive to detecting a crosswind activation condition, activating the actuator(s) to cause the molding to move away from the base structure. As a result, the aerodynamic characteristics of the interface can be altered. The actuator can include a bladder. The bladder can include a flexible casing and can define a fluid chamber. The fluid chamber can include a dielectric fluid. The actuator can include a first conductor and a second conductor operatively positioned on opposite portions of the bladder. The actuator can be configured such that, when electrical energy is supplied to the first conductor and the second conductor, the first conductor and the second conductor have opposite charges. As a result, the first conductor and the second conductor can be electrostatically attracted toward each other to cause at least a portion of the dielectric fluid to be displaced to an outer peripheral region of the fluid chamber. The outer peripheral region of the flexible casing can bulge such that an overall height of the actuator increases.

DETAILED DESCRIPTION

Figure 1:
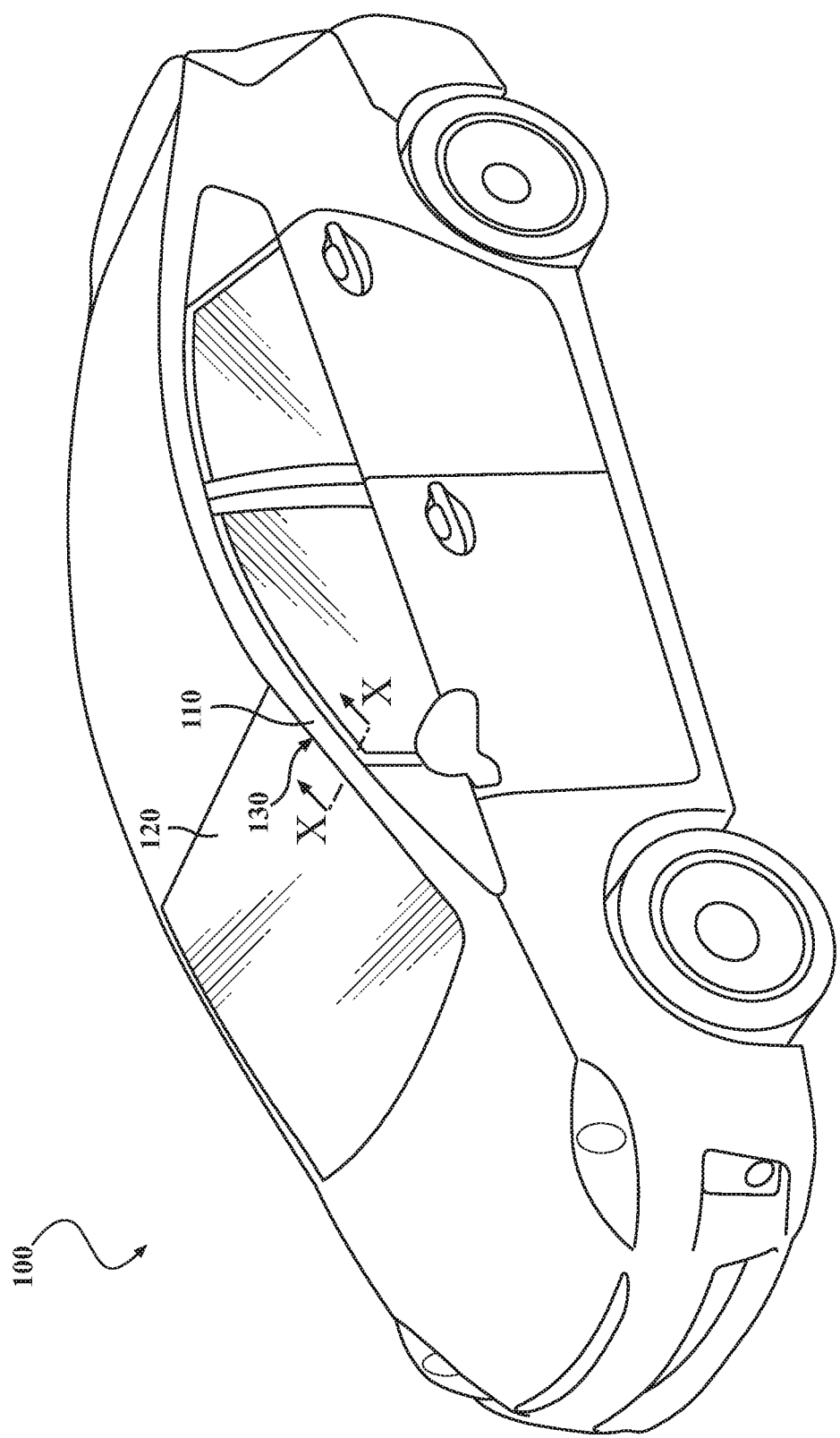
FIG. 1 is an example of a vehicle.

A static interface between an A-pillar and a windshield can provide good crosswind stability. However, the stepped configuration of the interface can generate noise, collect dirt and other substances, and/or increase drag. Accordingly to arrangements herein, a dynamic interface is provided. Such an interface can be actively managed to allow the configuration of the interface to be optimized based on real-time conditions. The interface can include one or more actuators that can be selectively activated or deactivated to change the aerodynamic characteristics of the interface.

The actuator(s) can include a bladder defining a fluid chamber that contains a dielectric fluid. The actuator(s) can include a first conductor and a second conductor operatively positioned on opposite portions of the bladder. The actuator(s) can be configured such that, when electrical energy is supplied to the first conductor and the second conductor, they are electrostatically attracted toward each other. As a result, at least a portion of the dielectric fluid can be displaced to an outer peripheral region of the fluid chamber, causing the outer peripheral region to bulge, which can increase the overall height of the actuator(s). In some instances, the actuator(s) can be activated manually in response to receiving an occupant input. In some instances, the actuator(s) can be activated automatically based on driving environment data acquired by one or more sensors, such as wind speed and/or wind angle data.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a portion of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle may be a watercraft, an aircraft or any other form of motorized transport.

The vehicle 100 can have an autonomous operational mode and/or a semi-autonomous operational mode. For instance, the vehicle 100 can have an autonomous operational mode in which or more computing systems are used to navigate and/or maneuver the vehicle along a travel route with no input or supervision required from a human driver. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can include one or more pillars. For instance, the vehicle 100 can include an A-pillar 110. The vehicle 100 can include a windshield 120. The windshield 120 can be any windshield now known or later developed. The windshield 120 can be made of glass. An interface 130 can be formed between the A-pillar 110 and the windshield 120. According to arrangements herein, the interface 130 can be configured to be dynamic, thereby allowing the interface 130 to be adjusted based on current conditions experienced by the vehicle 100.

Figure 2:
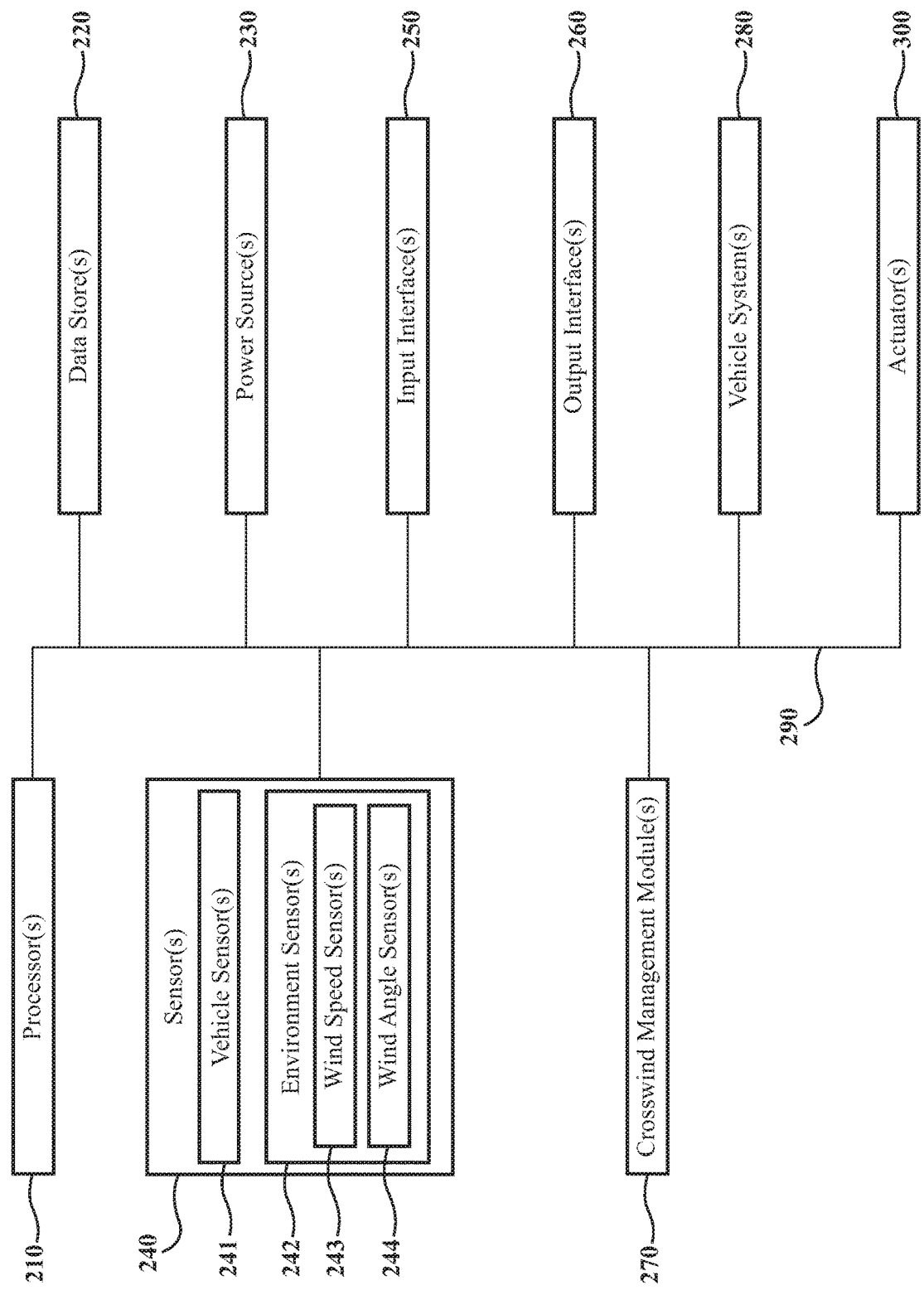
FIG. 2 is an example of various elements of the vehicle.

The vehicle 100 can include various elements. Some of the possible elements of the vehicle 100 are shown in FIG. 2 and will now be described. It will be understood that it is not necessary for the vehicle 100 to have all of the elements shown in FIG. 2 or described herein. The vehicle 100 can have any combination of the various elements shown in FIG. 2. Further, the vehicle 100 can have additional elements to those shown in FIG. 2. In some arrangements, the vehicle 100 may not include one or more of the elements shown in FIG. 2. Further, while the various elements may be shown as being located on or within the vehicle 100 in FIG. 2, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 210, one or more data stores 220, one or more power sources 230, one or more sensors 240, one or more input interfaces 250, one or more output interfaces 260, one or more crosswind management modules 270, one or more vehicle systems 280, and one or more actuator(s) 300. Each of these elements will be described in turn below.

As noted above, the vehicle 100 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other. In one or more arrangements, one or more processors 210 can be a main processor(s) of the vehicle 100. For instance, one or more processors 210 can be electronic control unit(s) (ECU).

The vehicle 100 can include one or more data stores 220 for storing one or more types of data. The data store(s) 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 220 can be a component of the processor(s) 210, or the data store(s) 220 can be operatively connected to the processor(s) 210 for use thereby. The term "operatively connected," as used throughout this description, can include direct or indirect connections, including connections without direct physical contact.

As noted above, the vehicle 100 can include one or more power sources 230. The power source(s) 230 can be any power source capable of and/or configured to energize the actuator(s) 300. For example, the power source(s) 230 can include one or more batteries, one or more fuel cells, one or more generators, one or more alternators, one or more solar cells, and combinations thereof. In some arrangements, the power source(s) 230 can be configured to supply positively charged electrical energy and/or negatively charged electrical energy.

The vehicle 100 can include one or more sensors 240. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 100 includes a plurality of sensors 240, the sensors can work independently from each other. Alternatively, two or more of the sensors can work in combination with each other. In such case, the two or more sensors can form a sensor network. The sensor(s) 240 can be operatively connected to the processor(s) 210, the data store(s) 220, and/or other elements of the vehicle 100 (including any of the elements shown in FIG. 2).

The sensor(s) 240 can include any suitable type of sensor. Various examples of different types of sensors will be described herein. However, it will be understood that the embodiments are not limited to the particular sensors described.

The sensor(s) 240 can include one or more vehicle sensors 241. The vehicle sensor(s) 241 can detect, determine, assess, monitor, measure, quantify and/or sense information about the vehicle 100 itself (e.g., position, orientation, speed, etc.). Alternatively or in addition, the sensor(s) 240 can include one or more environment sensors 242 configured to detect, determine, assess, monitor, measure, quantify, acquire, and/or sense driving environment data. "Driving environment data" includes and data or information about the external environment in which a vehicle is located or one or more portions thereof. In one or more arrangements, the environment sensors 242 can include one or more cameras, one or more radar sensors, one or more lidar sensors, one or more sonar sensors, and/or one or more ranging sensors. In one or more arrangements, the environment sensors 242 can include one or more wind speed sensors 243 and/or one or more wind angle sensors 244. The wind speed sensors 243 can be any sensor configured to detect, determine, assess, monitor, measure, quantify and/or sense the speed of the wind external to a vehicle, now known or later developed. The wind angle sensors 244 can be any sensor configured to detect, determine, assess, monitor, measure, quantify and/or sense the angle of the wind external to a vehicle, now known or later developed. The environment sensors 242 can include sensors to detect, determine, assess, monitor, measure, quantify and/or sense any information or data about the wind external to a vehicle.

The vehicle 100 can include one or more input interfaces 250. An "input interface" includes any device, component, system, element or arrangement or groups thereof that enable information/data to be entered into a machine. The input interface(s) 250 can receive an input from a vehicle occupant (e.g. a driver or a passenger). Any suitable input interface 250 can be used, including, for example, a keypad, display, touch screen, multi-touch screen, button, joystick, mouse, trackball, microphone and/or combinations thereof.

The vehicle 100 can include one or more output interfaces 260. An "output interface" includes any device, component, system, element or arrangement or groups thereof that enable information/data to be presented to a vehicle occupant (e.g. a person, a vehicle occupant, etc.). The output interface(s) 260 can present information/data to a vehicle occupant. The output interface(s) 260 can include a display. Alternatively or in addition, the output interface(s) 260 may include an earphone and/or speaker. Some components of the vehicle 100 may serve as both a component of the input interface(s) 250 and a component of the output interface(s) 260.

The vehicle 100 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data stores 220 may contain such instructions.

The vehicle 100 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The vehicle 100 can include one or more crosswind management modules 270. The crosswind management module(s) 270 can include profiles and logic for actively controlling seals according to arrangements herein. The crosswind management module(s) 270 can be configured to determine when a seal should be activated or deactivated. The crosswind management module(s) 270 can be configured to do so in any suitable manner. For instance, the crosswind management module(s) 270 can be configured to analyze data or information acquired by the sensor(s) 240 (e.g., the wind speed sensor(s) 223 and/or the wind angle sensor(s) 224). Alternatively or additionally, the crosswind management module(s) 270 can be configured to detect user inputs (e.g., commands) provided on the input interface(s) 250. The crosswind management module(s) 270 can retrieve raw data from the sensor(s) 240 and/or from the data store(s) 220. The crosswind management module(s) 270 can use profiles, parameters, or setting loaded into the crosswind management module(s) 270 and/or stored in the data store(s) 220.

The crosswind management module(s) 270 can analyze the sensor data to determine an appropriate action for the interface. The crosswind management module(s) 270 can be configured to cause one or more actuators 300 to be activated or deactivated. As used herein, "cause" or "causing" means to make, force, compel, direct, command, instruct, and/or enable an event or action to occur or at least be in a state where such event or action may occur, either in a direct or indirect manner. For instance, the crosswind management module(s) 270 can selectively permit or prevent the flow of electrical energy from the power source(s) 230 to the actuator(s) 300. The crosswind management module(s) 270 can be configured send control signals or commands over a communication network 290 to the actuator(s) 300.

The crosswind management module(s) 270 can be configured to cause the actuator(s) 300 to be selectively activated or deactivated based on one or more wind characteristics. For instance, the crosswind management module(s) 270 can be configured to compare one or more detected wind characteristics to one or more wind thresholds. For instance, there can be a wind speed threshold. In one or more arrangements, the wind speed threshold can be about 60 kilometers per hour (Kph). In other arrangements, the wind speed threshold can be about 40 Kph, about 45 Kph, about 50 Kph, about 55 Kph, about 65 Kph, about 70 Kph, or about 75 Kph, just to name a few possibilities. If a detected wind speed is above the wind speed threshold, the crosswind management module(s) 270 can be configured to cause the actuator(s) 300 to be activated or maintained in an activated state. If a detected wind speed is below the wind speed threshold, the crosswind management module(s) 270 can be configured to cause the actuator(s) 300 to be deactivated or maintained in a deactivated state.

As another example, there can be a wind angle threshold. The wind angle threshold can be defined relative to horizontal and/or the ground. In one or more arrangements, the wind angle threshold can be about 10 degrees. In other arrangements, the wind angle activation threshold can be about 5 degrees, about 6 degrees, about 7 degrees, about 8 degrees, about 9 degrees, about 11 degrees, about 12 degrees, about 13 degrees, about 14 degrees, about 15 degrees, about 16 degrees, about 17 degrees, about 18 degrees, about 19 degrees, about 20 degrees, about 25 degrees, or about 30 degrees, just to name a few possibilities. If a detected wind angle is above the wind angle threshold, the crosswind management module(s) 270 can be configured to cause the actuator(s) 300 to be activated or maintained in an activated state. If a detected wind angle is below the wind angle threshold, the crosswind management module(s) 270 can be configured to cause the actuator(s) 300 to be deactivated or maintained in a deactivated state.

In one or more arrangements, the crosswind management module(s) 270 can be configured to selectively the actuator(s) 300 to be selectively activated or deactivated based on both wind speed and wind angle. Thus, if a detected wind speed is above the wind speed threshold and if a detected wind angle is above the wind angle threshold, the crosswind management module(s) 270 can be configured to cause the actuator(s) 300 to be activated or maintained in an activated state. If a detected wind speed is below the wind speed threshold and/or if a detected wind angle are below the wind angle threshold, the crosswind management module(s) 270 can be configured to cause the actuator(s) 300 to be deactivated or maintained in a deactivated state.

The vehicle can include one or more vehicle systems 280. The one or more vehicle systems 280 can include a propulsion system, a braking system, a steering system, throttle system, a transmission system, and a signaling system. Each of these systems can include one or more mechanisms, devices, elements, components, systems, and/or combination thereof, now known or later developed. The above examples of the vehicle systems 280 are non-limiting. Indeed, it will be understood that the vehicle systems 280 can include more, fewer, or different vehicle systems. It should be appreciated that although particular vehicle systems are separately defined, each or any of the systems or portions thereof may be otherwise combined or segregated via hardware and/or software within the vehicle.

The vehicle 100 can include one or more actuators 300. The actuator(s) 300 will be described in greater detail below in connection with FIGS. 3A-3B. The actuator(s) 300 can be used in various vehicle interfaces, such as the interface 130 between the A-pillar 110 and the windshield 120.

The various elements of the vehicle 100 can be communicatively linked to one another or one or more other elements through one or more communication networks 290. As used herein, the term "communicatively linked" can include direct or indirect connections through a communication channel, bus, pathway or another component or system. A "communication network" means one or more components designed to transmit and/or receive information from one source to another. The data store(s) 220 and/or one or more other elements of the vehicle 100 can include and/or execute suitable communication software, which enables the various elements to communicate with each other through the communication network and perform the functions disclosed herein.

The one or more communication networks 290 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network 190 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 3A:
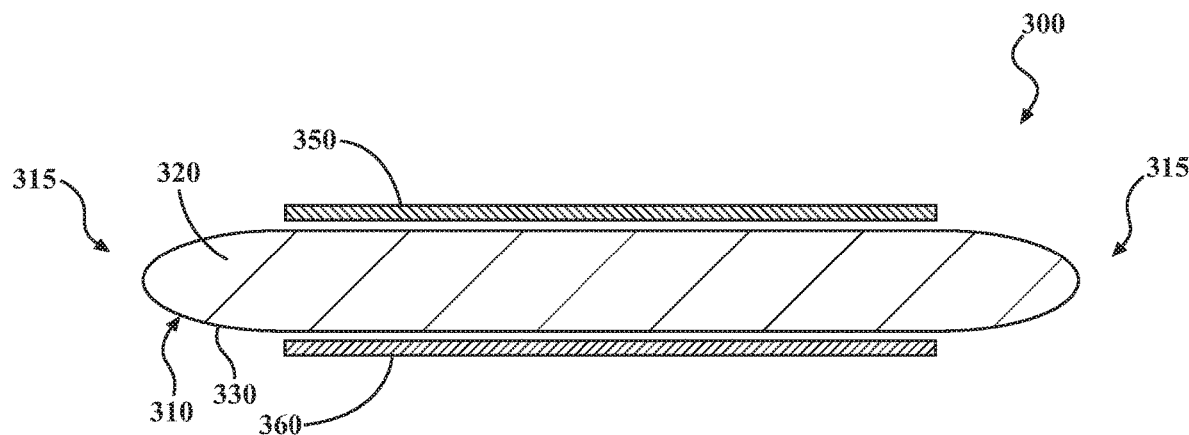
FIG. 3A depicts an example of an actuator, showing a non-activated condition.
Figure 3B:
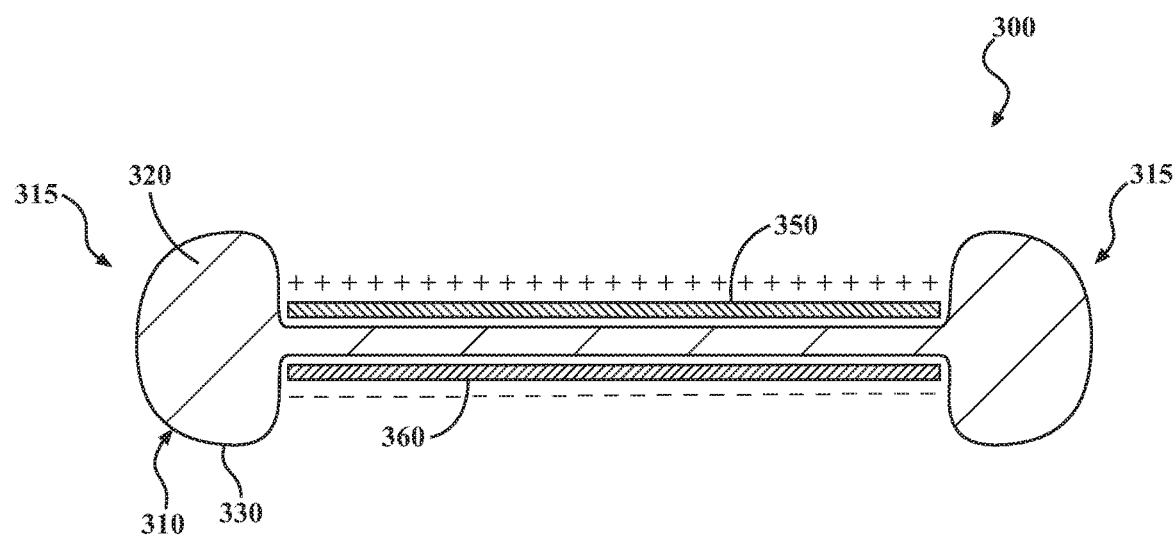
FIG. 3B depicts an example of the actuator, showing an activated condition.

Referring to FIGS. 3A-3B, a cross-sectional view of an example of an example of an actuator 300 is shown. The actuator 300 can have a body that is, at least in large part, made of a soft, flexible material. The actuator 300 can include a bladder 310 containing a dielectric fluid 320. The bladder 310 can include a casing 330. The casing 330 can be made of a single piece of material, or a plurality of separate pieces of material that are joined together. An inner surface of the casing 330 can define a fluid chamber. In one or more arrangements, the bladder 310 and/or fluid chamber can be fluid impermeable.

The bladder 310 can be made of any suitable material. For example, the bladder 310 can be made of an insulating material. The insulating material can be flexible. The insulating material can be a polymer and/or an elastomeric polymer (elastomer). The polymers or elastomers can be natural or synthetic in nature. In one or more arrangements, the insulating material can be silicone rubber. Additional examples of the insulating material include nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

A dielectric fluid 320 can be any suitable material. In one or more arrangements, the dielectric fluid 320 can be ethylene glycol. As an additional example, the dielectric fluid 320 can include transformer oil or mineral oil. In one or more arrangements, the dielectric fluid 320 can be a lipid based fluid, such as a vegetable oil-based dielectric fluid.

The dielectric fluid 320 can have various associated properties. The dielectric fluid 320 can have an associated dielectric constant. In one embodiment, the dielectric fluid 320 can have a dielectric constant of 1 or greater, 2 or greater, 3 or greater, 4 or greater, 5 or greater, 6 or greater, 7 or greater, 8 or greater, 9 or greater, 10 or greater, 20 or greater, 30 or greater, 40 or greater, 50 or greater, or higher.

In one or more arrangements, the dielectric fluid 320 can be a fluid that is resistant to electrical breakdown. In one or more arrangements, the dielectric fluid 320, can provide electrical insulating properties. In one or more arrangements, the dielectric fluid 320 can provide electrical insulating properties. In one or more arrangements, the dielectric fluid 320 can prevent arcing between surrounding conductors.

The actuator 300 can include a plurality of conductors. In the example shown in FIGS. 3A-3B, the actuator 300 can include a first conductor 350 and a second conductor 360. The conductors 350, 360 can conduct electrical energy. The conductors 350, 360 can be made of any suitable material, such as a conductive elastomer. In one or more arrangements, the conductors 350, 360 can be made of natural rubber with carbon or other conductive particles distributed throughout the material. The conductors 350, 360 can be made of the same material as each other, or the conductors 350, 360 can be made of different materials. One or more of the conductors 350, 360 can be formed by a single, continuous structure, or one or more of the conductors 350, 360 can be formed by a plurality of separate structures.

The first conductor 350 and the second conductor 360 can be located on opposite sides or portions of the bladder 310. Thus, the first conductor 350 and the second conductor 360 can be separated by the bladder 310. The first conductor 350 and/or the second conductor 360 can be operatively connected to the bladder 310 in any suitable manner. In some instances, the first conductor 350 and/or the second conductor 360 can be embedded within a wall of the bladder 310. In one or more arrangements, the first conductor 350 can be operatively positioned between the bladder 310 and an insulating material. In such case, the first conductor 350 can be substantially encapsulated by the bladder 310 and the insulating material. Also, the second conductor 360 can be operatively positioned between the bladder 310 and an insulating material. In one or more arrangements, the second conductor 350 can be substantially encapsulated by the bladder 310 and the insulating material. In one or more arrangements, the insulating material can be made of an insulating elastomer. Thus, it will be appreciated that, at least in some instances, the insulating material can define exterior surfaces of the actuator 300.

Each of the conductors 350, 360 can be operatively connected to receive electrical energy from a power source (e.g., the power source(s) 230). As a result, electrical energy can be selectively supplied to each individual conductors 350, 360.

The actuator 300 can have a non-activated mode and an activated mode. Each of these modes will be described in turn. FIG. 3A shows an example of a non-activated mode of the actuator 300. In such case, electrical energy is not supplied to the first conductor 350 and the second conductor 360. Thus, the first conductor 350 and the second conductor 360 can be spaced apart from each other. The bladder 310 can be in a neutral state. In some instances, a portion of the bladder 310 can extend beyond the outer edges of the first conductor 350 and the second conductor 360.

FIG. 3B shows an example of an activated mode of the actuator 300. In the actuated mode, power can be supplied to the first conductor 350 and the second conductor 360. In one implementation, the first conductor 350 can become positively charged and the second conductor 360 can become negatively charged. Thus, the first conductor 350 and the second conductor 360 can be oppositely charged. As a result, the first conductor 350 and the second conductor 360 can be attracted toward each other. The attraction between the first conductor 350 and the second conductor 360 can cause them and the respective portions of the bladder 310 to move toward each other. As a result, at least a portion of the dielectric fluid 320 within the fluid chamber can be squeezed toward the outer peripheral region(s) 315 of the bladder 310. In at least some instances, the outer peripheral region(s) 315 of the bladder 310 can bulge, as is shown in FIG. 3B. As the result, the outer peripheral region(s) 315 of the bladder 310 may increase the overall height of the actuator 300 (in the top to bottom direction on the page).

Figure 4A:
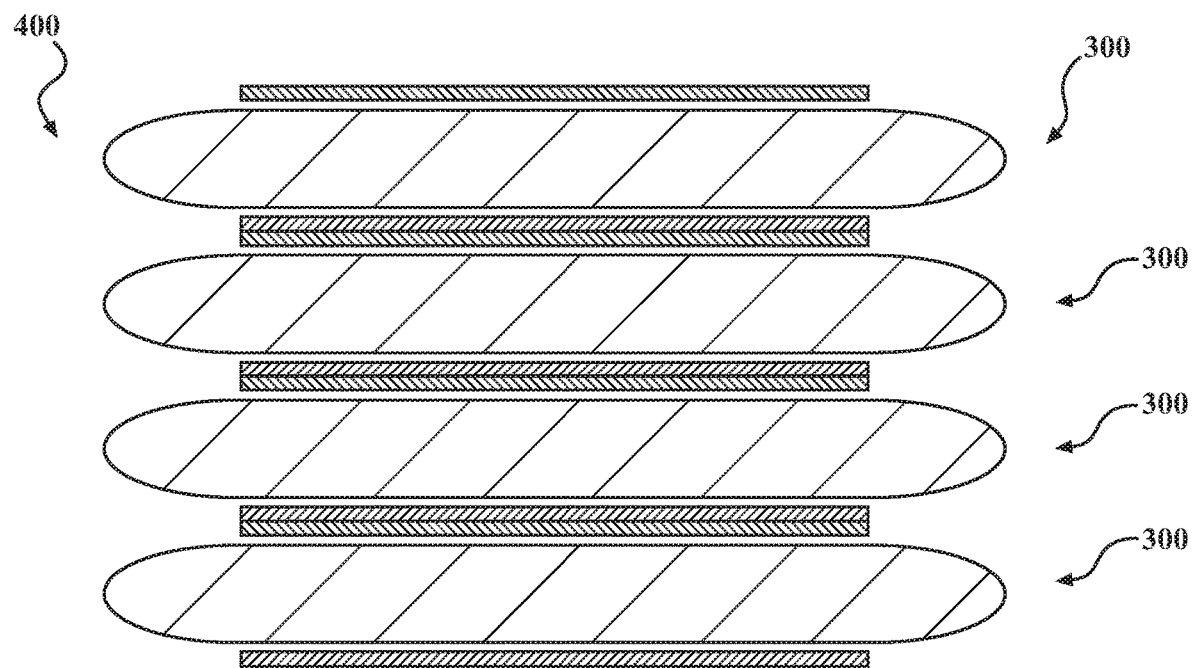
FIG. 4A depicts an example of a plurality of actuators arranged in a stack, showing a non-activated condition.
Figure 4B:
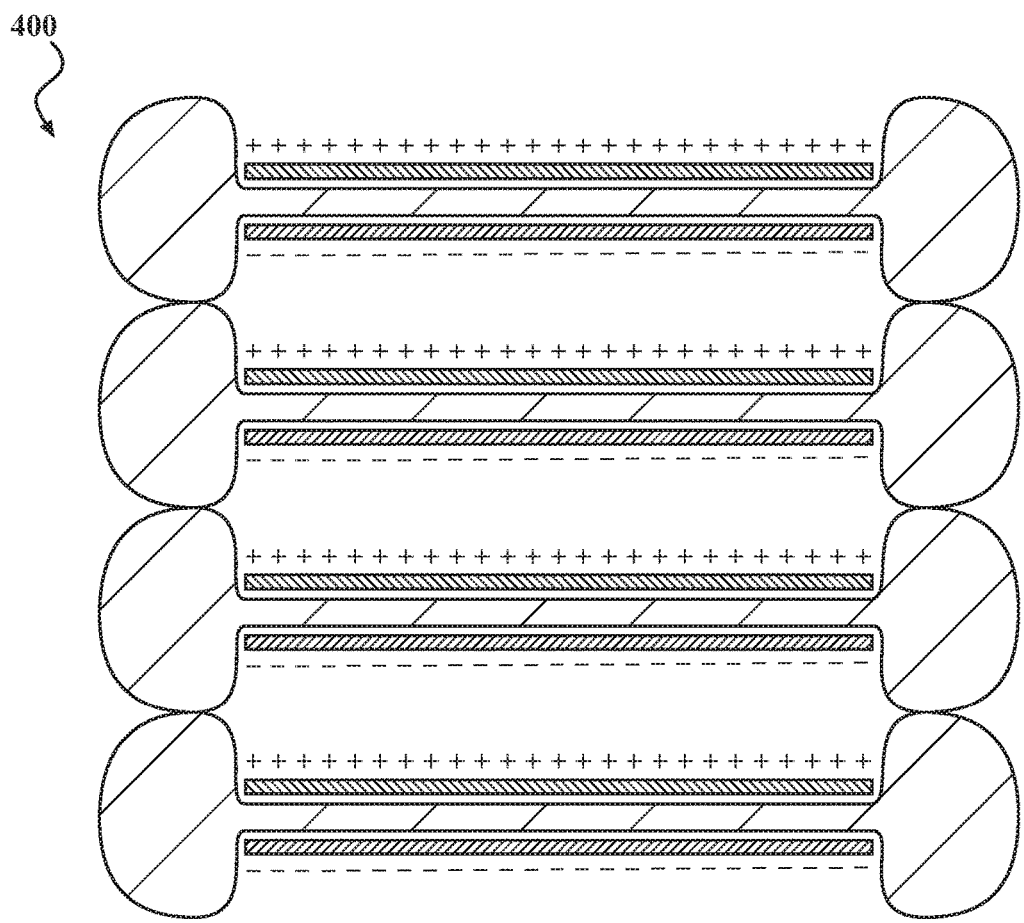
FIG. 4B depicts an example of the plurality of actuators arranged in a stack, showing an activated condition.

Turning now to FIGS. 4A-4B, an example of a plurality of actuators 300 arranged in an actuator stack 400 is shown. FIG. 4A shows the actuator stack 400 in a non-actuated mode. FIG. 4B shows the actuator stack 400 in an actuated mode. The above-description of the actuator 300 in connection with FIGS. 3A-3B applies equally to the individual actuators 300 in the actuator stack 400. It will be appreciated that, in going from the non-actuated mode to the actuated mode, the overall height (the top to bottom direction on the page) of the actuator stack 400 can increase. In such arrangements, it will be appreciated that the actuators 300 in the actuator stack 400 can be actuated individually or two or more of the actuators 300 can be actuated at the same time. Neighboring actuators 300 in the actuator stack 400 can be separated from each other by an insulating layer. In some instances, such an insulating layer can operatively connect the neighboring actuators 300 together.

Figure 5A:
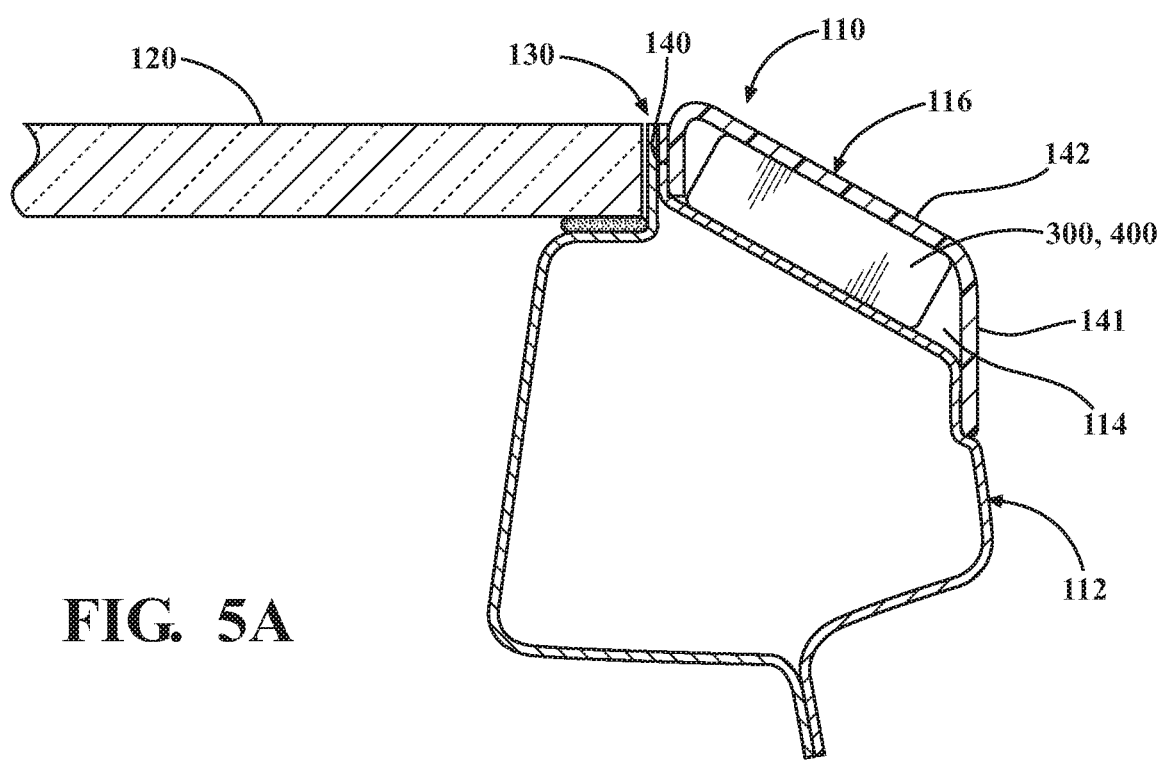
FIG. 5A-5B is cross-sectional view of a representation of the interface between the A-pillar and the windshield, taken along line X-X in FIG. 1, showing a first example of a dynamic interface arrangement.
Figure 5B:
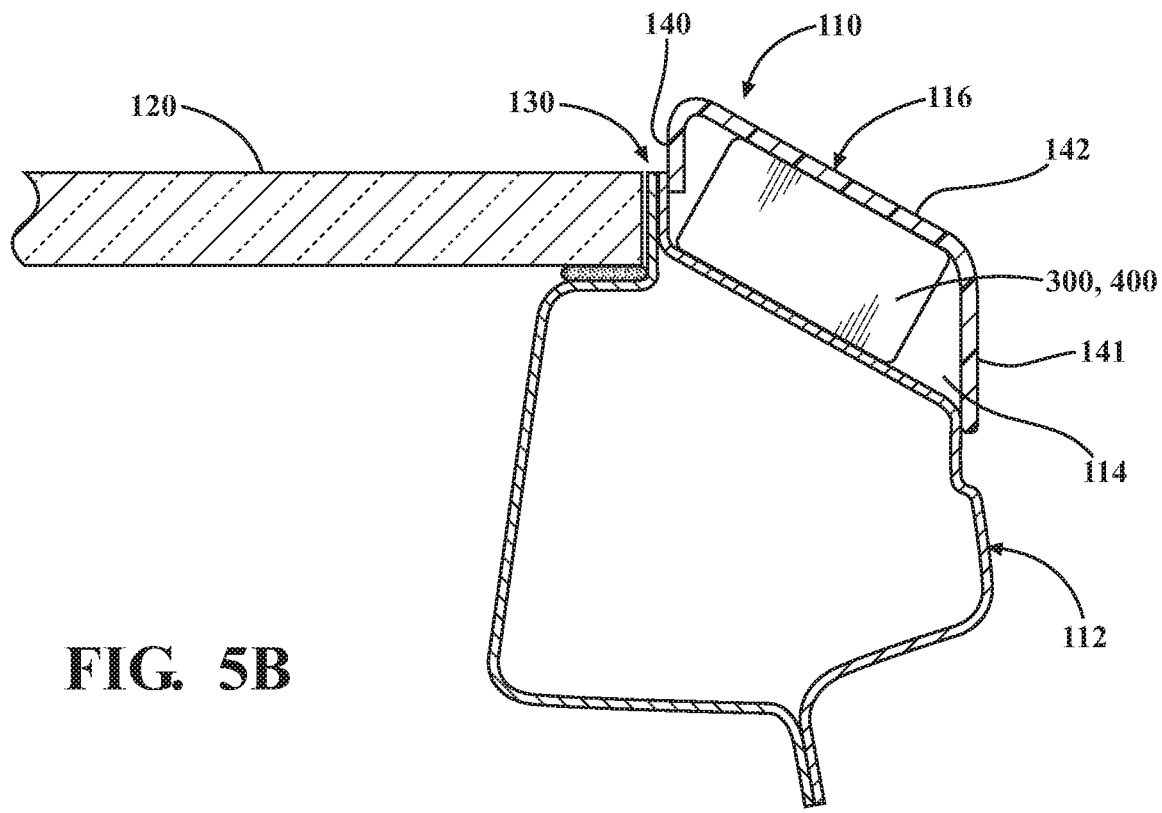

Various examples of the use of the actuators 300 and/or the actuator stacks 400 for crosswind management will now be described. Referring to FIGS. 5A-5B, a cross-sectional view of a first configuration for the interface 130 between the A-pillar 110 and the windshield 120, taken along line X-X in FIG. 1, is shown. The A-pillar 110 can include a base structure 112. A recess 114 can be defined in the base structure 112. The A-pillar 110 can also include a molding 116.

The molding 116 can include a first side portion 140, a second side portion 141, and a connecting portion 142. In one or more arrangements, the first side portion 140 and/or the second side portion 141 can be rigid or semi-rigid. In some arrangements, the connecting portion 142 can define a part of the exterior of the A-pillar. The molding 116 can be operatively connected to the base structure 112 in any suitable manner, such as by mechanical engagement, frictional engagement, etc. The molding 116 can be configured to readily separate from the base structure 112 when pushed by the actuator(s) 300. The molding 116 can be configured to move relative to the base structure 112.

According to arrangements herein, one or more actuators 300 or one or more actuator stacks 400 can be operatively positioned between the molding 116 and the base structure 112. In one or more arrangements, the actuator(s) 300 can be operatively connected to the base structure 112 and/or to the molding 116.

FIG. 5A shows an example of the interface 130 in a non-activated condition, and FIG. 5B shows the interface 130 in an activated condition. It will be appreciated that the non-deployed configuration shown in FIG. 5A can be implemented in situations in which cross wind stabilization is not needed. In such situations, the windshield 120 and the A-pillar 110 can be substantially aligned and/or substantially flush. Thus, there is substantially no step between the windshield 120 and the A-pillar 110. As a result, noise can be reduced and the infiltration or accumulation of dirt and other unwanted substances in the interface 130 is minimized. The molding 116 can be located close to the base structure 112. There can be overlap between the first and second side portions 140, 141 and the base structure 112.

The deployed configuration in FIG. 5B can be implemented when cross wind stabilization is needed. In such case, there can be a step formed at the interface 130 between the windshield 120 and the A-pillar 110. Thus, the configuration of the interface 130 can be changed, which affect the aerodynamic characteristics of the interface 130. As a result, vortices can be directed away from the vehicle 100, thereby minimizing aerodynamic losses.

The actuator(s) 300 can be configured such that, when activated, they push the molding 116 away from the base structure 112, as is shown in FIG. 5B. When fully extended, the molding 116 can, in some arrangements, be completely separated from the base structure 112. In such case, there may be no overlap between the first and second side portions 140, 141 and the base structure 112. Also, there may be a spacing between the base structure 112 and the molding 116. However, in other arrangements, there may still be some overlap between the first and second side portions 140, 141 and the base structure 112 when the molding 116 is fully extended.

Figure 6A:
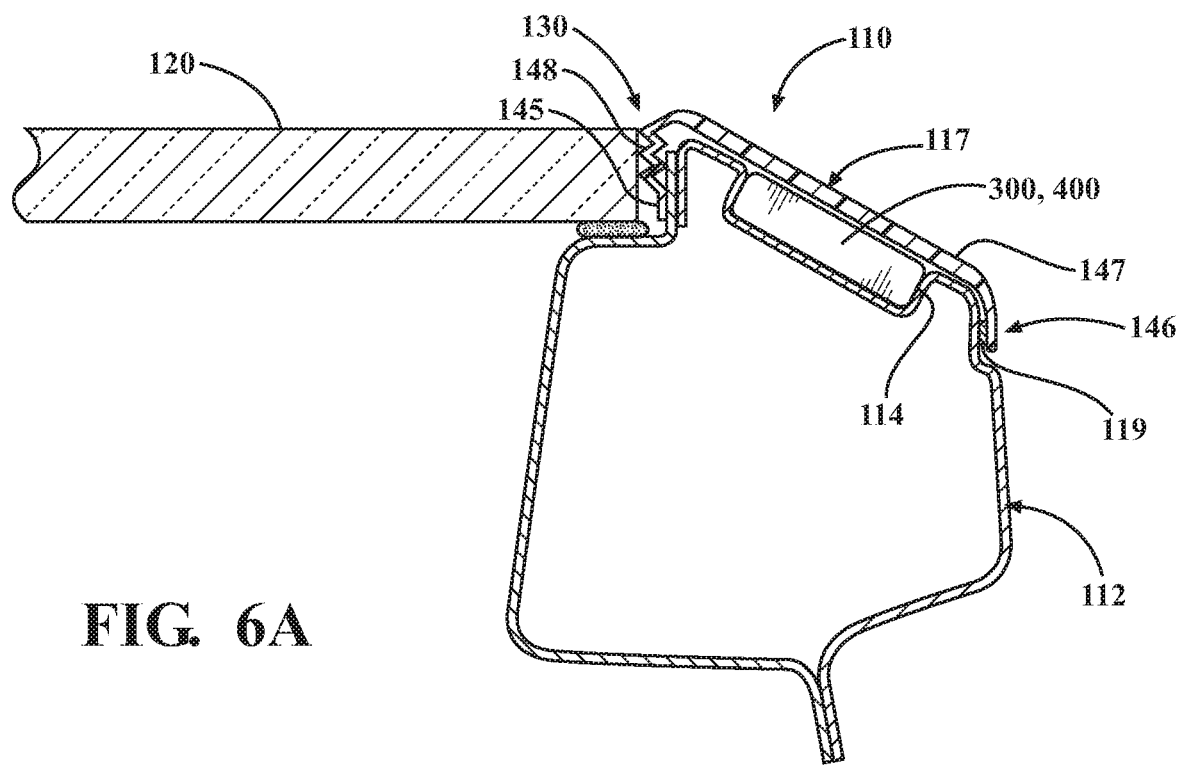
FIG. 6A-6B is cross-sectional view of a representation of the interface between the A-pillar and the windshield, taken along line X-X in FIG. 1, showing a second example of a dynamic interface arrangement.
Figure 6B:
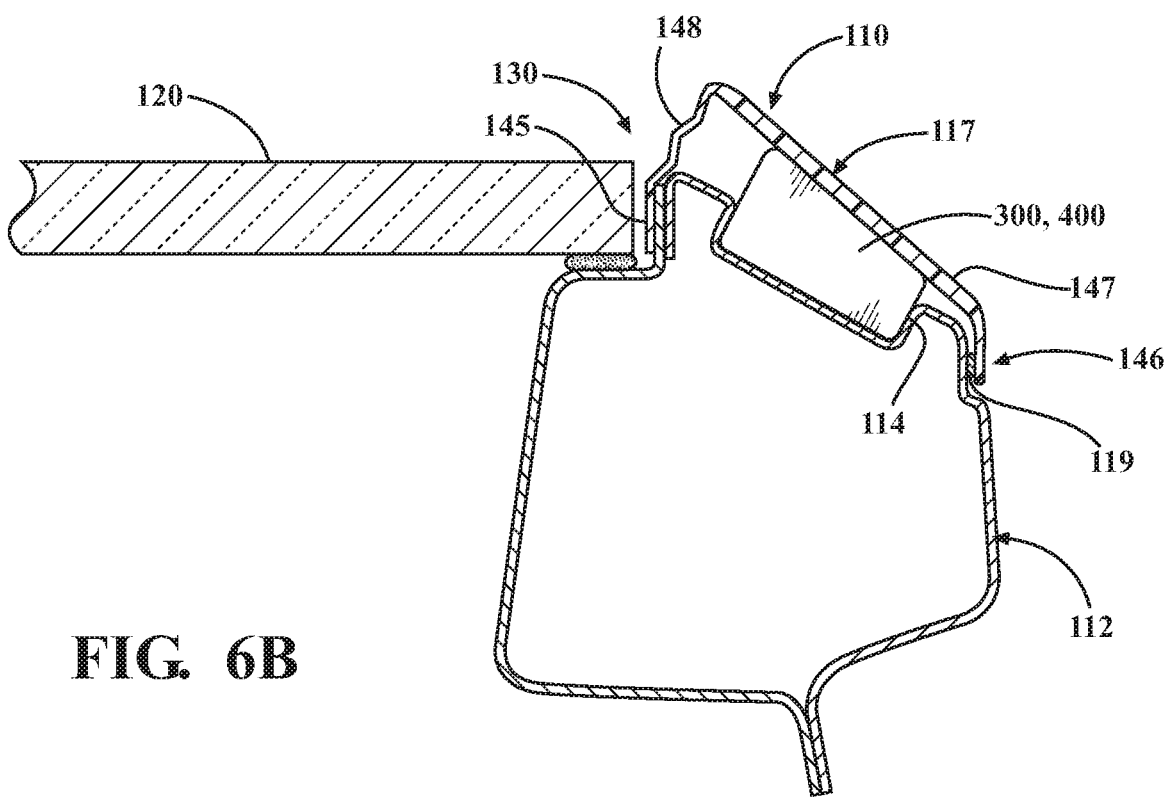

Referring to FIGS. 6A-6B, a cross-sectional view of a second configuration for the interface 130 between the A-pillar 110 and the windshield 120, taken along line X-X in FIG. 1, is shown. The A-pillar 110 can include a base structure 112. A recess 114 can be defined in the base structure 112. The A-pillar 110 can also include a molding 117.

The molding 117 can include a first side portion 145, a second side portion 146, and a connecting portion 147. In one or more arrangements, the first side portion 145 and the connecting portion 147 can be connected in a way that can allow the connection 148 to be selectively expanded or collapsed, such as in an accordion-like or bellows-like manner. In such case, the connection 148 can include one or more folds or can otherwise be concertinaed, thereby allowing the connection 148 to be expanded and collapsed. In some arrangements, the connection 148 can be made of a flexible material. In other examples, the connection 148 can be made of a plurality of individual configured for interlocking engagement with each other, such as by providing interlocking flanges or other structures. These structures can sequentially engage and/or disengage each other at the molding 117 is moved. The first side portion 145 and/or the second side portion 146 can be rigid or semi-rigid. The connecting portion 147 can define a part of the exterior of the A-pillar 110.

The molding 117 can be operatively connected to the base structure 112 in any suitable manner. For instance, the first side portion 145 can be connected to the base structure by one or more fasteners, one or more adhesives, one or more forms of mechanical engagement, and/or any other form of connection now known or later developed. The second side portion 146 can be attached to the base structure 112 in any suitable manner. In one or more arrangements, the second side portion 146 can be pivotably attached to the base structure 112 in any suitable manner, now known or later developed. For instance, the second side portion 146 can be operatively connected to the base structure 112 using one or more hinges 119. The connection of the first and second side portions 145, 146 to the base structure 112 can help to ensure that the interface between the molding 117 and the base structure 112 remains closed when deployed, thereby, preventing dirt or other substances from infiltrating the interface 130.

According to arrangements herein, one or more actuators 300 or one or more actuator stacks 400 can be operatively positioned between the molding 117 and the base structure 112. In one or more arrangements, the actuator(s) 300 can be operatively connected to the base structure 112 and/or to the molding 117.

FIG. 6A shows an example of the interface 130 in a non-activated condition, and FIG. 6B shows the interface 130 in an activated condition. It will be appreciated that the non-deployed configuration shown in FIG. 6A can be implemented in situations in which cross wind stabilization is not needed. In such situations, the windshield 120 and the A-pillar 110 can be substantially aligned and/or substantially flush. Thus, there is substantially no step between the windshield 120 and the A-pillar 110. As a result, noise can be reduced and the infiltration or accumulation of dirt and other unwanted substances in the interface 130 is minimized. The molding 117 can be located close to the base structure 112.

The deployed configuration in FIG. 7B can be implemented when cross wind stabilization is needed. In such case, there can be a step formed at the interface 130 between the windshield 120 and the A-pillar 110. Thus, the configuration of the interface 130 can be changed, which affect the aerodynamic characteristics of the interface 130. As a result, vortices can be directed away from the vehicle 100, thereby minimizing aerodynamic losses.

The actuator(s) 300 can be configured such that, when activated, they push the molding 117 away from the base structure 112, as is shown in FIG. 6B. In particular, the connection 148 between the first side portion 145 and the connecting portion 147 can expand. The second side portion 146 of the molding 117 can pivot via the hinges 119. When the actuator(s) 300 are not activated, the molding 117 can be located closer to the base structure 112. Thus, the configuration of the interface 130 can be changed.

Figure 7:
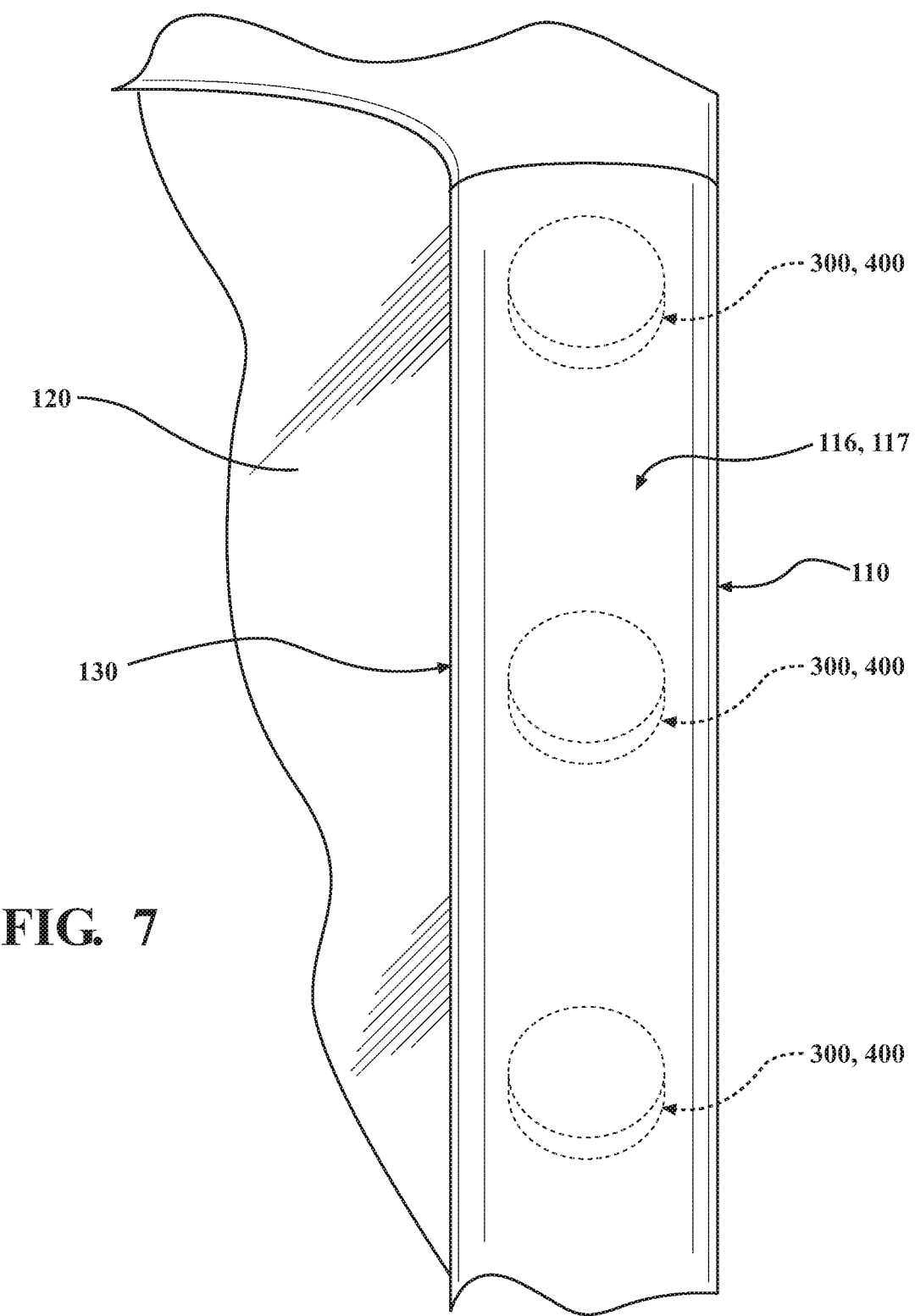
FIG. 7 is a view of a portion of the interface between the A-pillar and the windshield, showing a plurality of actuators distributed along the length of the A-pillar.

In the arrangements shown in FIGS. 5 and 6 and in other arrangements, it should be noted that the actuator 300 can be a single actuator, a single stack of actuators, a plurality of actuators, a plurality of stacks of actuators, and/or combinations thereof. In instances in which the actuator 300 is a plurality of actuators 300 and/or a plurality of actuator stacks 400, the actuators 300 and/or actuator stacks 400 can be distributed along the length of the A-pillar 110 in any suitable manner. One example of a distribution of actuators 300 or actuator stacks 400 is shown in FIG. 7. In such case, the actuators 300 or actuator stacks 400 can be arranged in a row at substantially regular intervals. However, it will be appreciated that the actuators 300 or actuator stacks 400 can be distributed in other manners, such as at irregular intervals. Also, the actuators 300 or actuator stacks 400 may not be arranged in a row, as one or more actuators 300 or one or more actuator stacks 400 can be offset from the other actuators 300 or actuator stacks 400.

Now that the various potential systems, devices, elements and/or components of the vehicle 100 have been described, various methods will now be described. Various possible steps of such methods will now be described. The methods described may be applicable to the arrangements described above in relation to FIGS. 1-7, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 8:
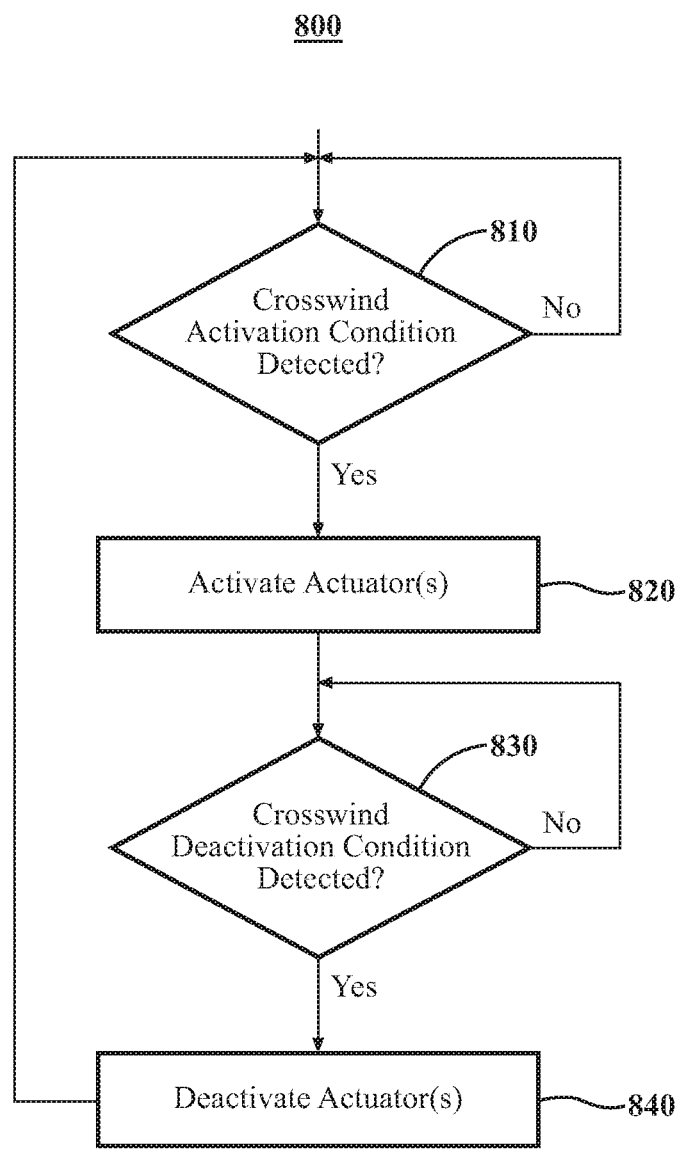
FIG. 8 is an example of a method of actively managing crosswinds at a vehicle interface.

Turning to FIG. 8, an example of a method 800 of actively managing an A-pillar-windshield interface is shown. For the sake of discussion, the method 800 can begin with the actuator(s) 300 or actuator stack(s) 400 in a non-activated mode, such as is shown in FIGS. 3A and/or 4A. In the non-activated mode, electrical energy from the power source(s) 230 is not supplied to the actuator(s) 300 and/or actuator stack(s) 400. At block 810, it can be determined whether a crosswind activation condition has been detected. The crosswind activation condition may be detected by the crosswind management module(s) 270, the processor(s) 210, and/or one or more sensor(s) 240. For instance, the crosswind management module(s) 270, the processor(s) 210, and/or one or more sensor(s) 240 can determine that current driving environment data meets a crosswind activation condition. For instance, crosswind management module(s) 270, the processor(s) 210, and/or one or more sensor(s) 240 can determine whether the current wind speed and/or the current wind angle meet respective crosswind activation thresholds. Alternatively or in addition, the crosswind management module(s) 270 can detect a user input indicating that the interface should be activated. The user input can be provided via the input interface(s) 250.

If a crosswind activation condition is not detected, the method 800 can end, return to block 810, or proceed to some other block. However, if a crosswind activation condition is detected, then the method can proceed to block 820. At block 820, the actuator(s) 300 can be activated. Thus, the crosswind management module(s) 270 and/or the processor(s) 210 can cause the flow of electrical energy from the power sources(s) 230 to the actuator(s) 300.

As a result, the first conductor 350 and the second conductor 360 can become oppositely charged, which causes them to attract each other. As a result, the actuator 300 can morph to an activated shape, such as is shown in FIG. 3B or 4B. The method can continue to block 830.

At block 830, it can be determined whether a crosswind deactivation condition has been detected. The crosswind deactivation condition may be detected by the crosswind management module(s) 270, such as by detecting a user input, the cessation of a user input, and/or based on data acquired by the sensor(s) 240. If a deactivation condition is not detected, the method 800 can return to block 830, or proceed to some other block. However, if a deactivation condition is detected, then the method can proceed to block 840. At block 840, the actuator(s) 300 can be deactivated. Thus, the crosswind management module(s) 270 and/or the processor(s) 210 can cause the flow of electrical energy from the power sources(s) 230 to the actuator(s) 300 to be discontinued.

The method 800 can end. Alternatively, the method 800 can return to block 810 or some other block.

It will be appreciated that arrangements described herein can provide numerous benefits, including one or more of the benefits mentioned herein. For example, arrangements described herein can allow for a variable interface that can be adjusted as needed depending on current conditions. In the case of an interface between an A-pillar and a windshield, arrangements described herein can provide an interface that provides good crosswind stabilization in some conditions while reducing noise and the buildup of dirt and other substances at the interface during other condition. Arrangements described herein can avoid the use of large and complicated gears and actuators, thereby enabling more compact designs and packaging. Arrangements described here can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A system for actively managing crosswinds for a vehicle, the system comprising:
    a windshield;
    an A-pillar including a base structure and a molding, the molding being selectively movable, an interface being defined between the windshield and the A-pillar; and
    at least one actuator operatively positioned between the base structure and the molding to cause the molding to move, whereby aerodynamic characteristics of the interface are actively managed, the at least one actuator including:
        a bladder, the bladder including a flexible casing and defining a fluid chamber, the fluid chamber including a dielectric fluid; and
        a first conductor and a second conductor operatively positioned on opposite portions of the bladder,
    the at least one actuator being configured such that, when electrical energy is supplied to the first conductor and the second conductor, the first conductor and the second conductor have opposite charges, whereby the first conductor and the second conductor are electrostatically attracted toward each other to cause at least a portion of the dielectric fluid to be displaced to an outer peripheral region of the fluid chamber, whereby an overall height of the at least one actuator increases;
    one or more processors;
    one or more power sources operatively connected to the at least one actuator, the one or more processors being operatively connected to control a supply of electrical energy from the one or more power sources to the at least one actuator; and
    one or more sensors operatively connected to the one or more processors, the one or more sensors being configured to acquire driving environment data, and the at least one actuator being selectively activated or deactivated based on driving environment data acquired by the one or more sensors, the driving environment data including wind speed and wind angle.

2. The system of claim 1, wherein the at least one actuator is operatively connected to at least one of the base structure and the molding.

3. The system of claim 2, wherein the entire molding is movable relative to the base structure in response to movement of the at least one actuator when activated or deactivated.

4. The system of claim 2, wherein a portion of the molding is configured to expand or collapse in response to movement of the at least one actuator when activated or deactivated.

5. The system of claim 1, further including:
    an input interface, wherein the at least one actuator is selectively activated or deactivated responsive to a user input provided on the input interface.

6. The system of claim 1, wherein the at least one actuator is a plurality of actuators.

7. The system of claim 6, wherein the plurality of actuators are arranged in a stack.

8. A method of actively managing crosswinds at an interface of a vehicle, the interface being defined between a windshield and an A-pillar, the A-pillar including a base structure and a molding, the molding being selectively movable by at least one actuator, the method comprising:
    acquiring, using one or more environment sensors onboard the vehicle, driving environment data, the driving environment data including wind speed and wind angle;
    detecting a crosswind activation condition based on the acquired driving environment data; and
    responsive to detecting a crosswind activation condition, activating the at least one actuator to cause the molding to move away from the base structure, the at least one actuator including:
        a bladder, the bladder including a flexible casing and defining a fluid chamber, the fluid chamber including a dielectric fluid; and
        a first conductor and a second conductor operatively positioned on opposite portions of the bladder,
    the at least one actuator being configured such that, when electrical energy is supplied to the first conductor and the second conductor, the first conductor and the second conductor have opposite charges, whereby the first conductor and the second conductor are electrostatically attracted toward each other to cause at least a portion of the dielectric fluid to be displaced to an outer peripheral region of the fluid chamber, whereby an overall height of the at least one actuator increases.

9. The method of claim 8, wherein detecting a crosswind activation condition including:
    comparing the acquired driving environment data to one or more crosswind activation condition thresholds; and
    if the acquired driving environment data meets the one or more crosswind activation condition thresholds, then a crosswind activation condition is detected.

10. The method of claim 8, wherein activating the at least one actuator to cause the molding to move away from the base structure includes the at least one actuator pushing the entire molding away from the base structure.

11. The method of claim 8, wherein activating the at least one actuator to cause the molding to move away from the base structure includes causing a portion of the molding to expand in response to movement of the at least one actuator.

12. The method of claim 8, wherein the at least one actuator is operatively connected to at least one of the base structure and the molding.

13. The method of claim 8, further including:
  detecting a crosswind deactivation condition; and
  responsive to detecting a crosswind deactivation condition, deactivating the at least one actuator to cause the molding to move toward the base structure, whereby the windshield and the A-pillar are substantially flush.

* * * * *

UNITED STATES PATENT AND TRADEMARK OFFICE
CERTIFICATE OF CORRECTION

| | |
|---|---|
| PATENT NO. | : 11,479,308 B2 |
| APPLICATION NO. | : 16/243562 |
| DATED | : October 25, 2022 |
| INVENTOR(S) | : Umesh N. Gandhi et al. |

It is certified that error appears in the above-identified patent and that said Letters Patent is hereby corrected as shown below:

In the Specification

Column 7, Line 34: delete "wind angle are below" and insert --wind angle is below--

Column 9, Line 39: delete "each individual conductors" and insert --each individual conductor--

Signed and Sealed this
Twentieth Day of December, 2022

*Katherine Kelly Vidal*

Katherine Kelly Vidal
*Director of the United States Patent and Trademark Office*